United States Patent
Ford et al.

(10) Patent No.: US 9,619,776 B1
(45) Date of Patent: Apr. 11, 2017

(54) SYSTEMS AND METHODS FOR INDIVIDUALIZED ROUTING AND TRANSPORTATION OF PARCELS

(71) Applicant: Dell Software Inc., Aliso Viejo, CA (US)

(72) Inventors: Daniel A. Ford, Mount Kisco, NY (US); Rajesh Narayanan, San Jose, CA (US); Gabriel Mauricio Silberman, Austin, TX (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/615,845

(22) Filed: Feb. 6, 2015

(51) Int. Cl.
*G06Q 10/08* (2012.01)
*G05D 1/00* (2006.01)
*G05D 1/02* (2006.01)
*B64C 39/02* (2006.01)

(52) U.S. Cl.
CPC ..... *G06Q 10/08355* (2013.01); *B64C 39/026* (2013.01); *G05D 1/0088* (2013.01); *G05D 1/02* (2013.01); *B64C 2201/128* (2013.01); *B64C 2201/141* (2013.01)

(58) Field of Classification Search
CPC .................... B64C 2201/128; B64C 2201/208
See application file for complete search history.

(56) References Cited

U.S. PATENT DOCUMENTS

| | | |
|---|---|---|
| 5,240,207 A | 8/1993 | Eiband et al. |
| 6,795,823 B1 | 9/2004 | Aklepi et al. |
| 2010/0253111 A1 | 10/2010 | Reeder et al. |
| 2014/0025229 A1 | 1/2014 | Levien et al. |
| 2014/0032034 A1 | 1/2014 | Raptopoulos et al. |
| 2014/0254896 A1 | 9/2014 | Zhou et al. |
| 2015/0370251 A1* | 12/2015 | Siegel .................. G05D 1/0027 701/2 |
| 2016/0068265 A1* | 3/2016 | Hoareau ............... B64C 39/024 701/3 |
| 2016/0196525 A1 | 7/2016 | Kantor et al. |

OTHER PUBLICATIONS

Drake, Samantha; "Growth Strategies: Crowdsource Your Next Delivery"; www.entrepreneur.com; Jun. 13, 2013; 5 pages.
(Continued)

*Primary Examiner* — Michael D Lang
(74) *Attorney, Agent, or Firm* — Winstead PC

(57) ABSTRACT

In one embodiment, a method includes determining real-time location information for a transportation item. The method further includes determining real-time route information for a plurality of vehicles, the plurality of vehicles comprising a vehicle-in-transit actively transporting the transportation item. In addition, the method includes analyzing, via the real-time location information and the real-time route information, a route efficiency of the plurality of vehicles relative to an intended destination of the transportation item. Further, the method includes selecting a replacement vehicle from among the plurality of vehicles based, at least in part, on a result of the analyzing. Additionally, the method includes initiating physical transfer of the transportation item from the vehicle-in-transit to the replacement vehicle.

15 Claims, 8 Drawing Sheets

(56) References Cited

OTHER PUBLICATIONS

Deliv; "Deliv Partners with GGP to Bring Same-Day Delivery to Mall Shoppers"; www.deliv.co; Aug. 30, 2013; 3 pages.
Doublestein, Stephanie; "Zipments: A Simple and Elegant Courier Concept"; www.rapidgrowthmedia.com; Jun. 30, 2011; 4 pages.
Sharma, Mahesh; "Zipments Closes $2.25 Million Seed Round to Speed up Same-Day Deliveries"; techcrunch.com; Sep. 16, 2013; 7 pages.

* cited by examiner

SYSTEMS AND METHODS FOR INDIVIDUALIZED ROUTING AND TRANSPORTATION OF PARCELS

BACKGROUND

Technical Field

The present disclosure relates generally to transportation and more particularly, but not by way of limitation, to systems and methods for individualized routing and transportation of parcels.

History of Related Art

Parcels such as packages and other items are typically shipped from one geographic location to another using a dedicated commercial shipping service. In the simplest scenario, the method of shipping usually involves the item being loaded into a truck, driven to the destination, unloaded, and then delivered. In more complicated scenarios, the parcel might be loaded and unloaded several times from dedicated trucks, planes or the like at dedicated transshipment depots or meet-up points before ultimately being delivered to its destination. While this arrangement is functional, it lacks efficiency.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes determining real-time location information for a transportation item. The method further includes determining real-time route information for a plurality of vehicles, the plurality of vehicles comprising a vehicle-in-transit actively transporting the transportation item. In addition, the method includes analyzing, via the real-time location information and the real-time route information, a route efficiency of the plurality of vehicles relative to an intended destination of the transportation item. Further, the method includes selecting a replacement vehicle from among the plurality of vehicles based, at least in part, on a result of the analyzing. Additionally, the method includes initiating physical transfer of the transportation item from the vehicle-in-transit to the replacement vehicle.

In one embodiment, an information handling system includes at least one processor. The at least one processor is operable to implement a method. The method includes determining real-time location information for a transportation item. The method further includes determining real-time route information for a plurality of vehicles, the plurality of vehicles comprising a vehicle-in-transit actively transporting the transportation item. In addition, the method includes analyzing, via the real-time location information and the real-time route information, a route efficiency of the plurality of vehicles relative to an intended destination of the transportation item. Further, the method includes selecting a replacement vehicle from among the plurality of vehicles based, at least in part, on a result of the analyzing. Additionally, the method includes initiating physical transfer of the transportation item from the vehicle-in-transit to the replacement vehicle.

In one embodiment, a computer-program product includes a non-transitory computer-usable medium having computer-readable program code embodied therein. The computer-readable program code is adapted to be executed to implement a method. The method includes determining real-time location information for a transportation item. The method further includes determining real-time route information for a plurality of vehicles, the plurality of vehicles comprising a vehicle-in-transit actively transporting the transportation item. In addition, the method includes analyzing, via the real-time location information and the real-time route information, a route efficiency of the plurality of vehicles relative to an intended destination of the transportation item. Further, the method includes selecting a replacement vehicle from among the plurality of vehicles based, at least in part, on a result of the analyzing. Additionally, the method includes initiating physical transfer of the transportation item from the vehicle-in-transit to the replacement vehicle.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
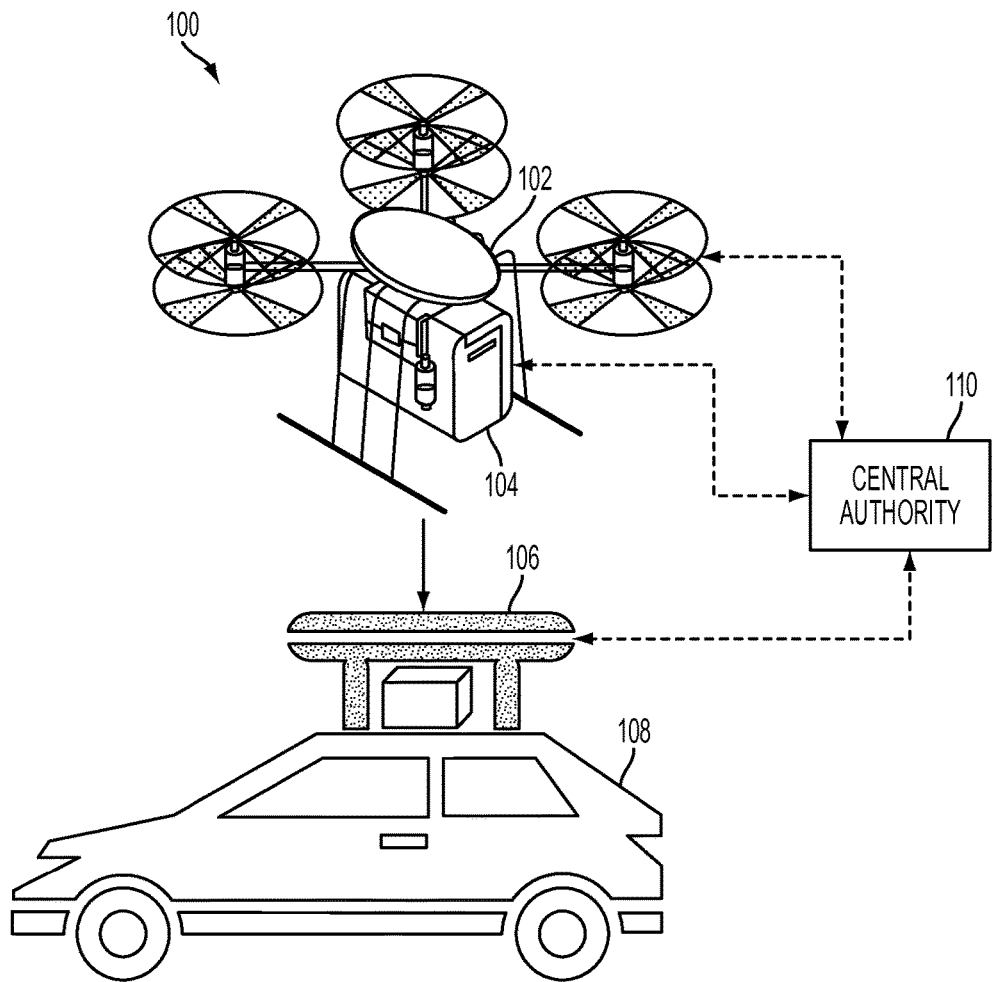
FIG. 1 illustrates an example of a transportation scheme.

In a modern urban environment such as a city, there is often no shortage of vehicles traveling in all directions, at all hours of the day. Even between cities, in rural areas, there is typically a steady flow of traffic in the form of trains, trucks, buses and passenger cars. The vehicles are usually large and powerful compared to a parcel such as a package or other item and oftentimes could transport a parcel from one location to another with little additional burden or cost. However, this transportation capacity is almost never exploited. Instead, in current practice, most parcels are transported from one location to another in dedicated transportation vehicles that travel side-by-side, on the same roads, as the non-dedicated transportation vehicles. This duplication is an inefficient use of resources.

At any time, on a typical road, the dedicated transportation vehicles are vastly outnumbered by the non-dedicated vehicles, such that the cargo of parcels carried by any particular dedicated transportation vehicle could, in theory, be redistributed to the non-dedicated vehicles that pass it on the road with little impact on the non-dedicated vehicles. The dedicated vehicles, and most of their supporting infrastructure, could be eliminated, and the items could still be transported to their destinations making a more efficient use of resources. However, there are technical difficulties in designing and implementing such a scheme. Orchestrating a scheme, in which items are assigned to a moving collection of vehicles traveling in different directions such that the items reach their destination, is technically challenging.

One way to approach this problem would be to attempt a form of manual assignment in which drivers of vehicles drive to a special location, disclose their destination, and are then given a parcel to carry with them to that destination. Such an approach would move parcels from one location to another, but would not be particularly efficient, nor would the extra overhead of going to a special assignment station be overly attractive to drivers who simply wish to get to their destination. Although various permutations and incentives could be created to improve the system, the manual processing would not easily scale to have the capacity of a dedicated transportation system, regardless of how many vehicles were on the road.

The present disclosure describes examples of enabling individualized movement of parcels and items such that they can be attached and detached from non-dedicated vehicles under programmatic control. In certain embodiments, parcels can be attached to vehicles traveling to, or near to, their intended destination (e.g., an ultimate delivery destination). If the vehicle of attachment does not travel to the exact destination, the item could be detached from it, and then attached to a different vehicle that would take it closer to that destination. In this manner, a particular autonomous parcel might "hop" from one vehicle to another multiple times as it maneuvers its way to its destination.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an example of a transportation scheme 100 for a parcel such as a package or other item. The transportation scheme 100 includes an unmanned vehicle (UMV) 102, a computerized parcel container (CPC) 104, a UMV dock 106, and a central authority 110. More particularly, the CPC 104 can be a portable, intelligent vault that is operable to enclose and secure the parcel. In a typical embodiment, the UMV 102 is operable to carry, or escort, the CPC 104 to an intended destination of the parcel, at least in part, by being attached to the UMV dock 106 of a vehicle 108. The intended destination can be represented as a particular address, particular geographic coordinates, or in any other suitable way to identify a location. In general, the UMV 102, the CPC 104, the UMV dock 106, and the central authority 110 can each include one or more computer systems such as information handling systems. An example will be described with respect to FIG. 2.

In some embodiments, the CPC 104 can serve as an intelligent enclosure (e.g., intelligent strongbox) for the parcel. In general, the parcel can be placed in the CPC 104 in any suitable fashion such as, for example, in an automated fashion via robots in a warehouse, in a manual fashion by humans, and/or the like. The CPC 104 can engage with, or attach to, the UMV 102 in any suitable fashion. For example, in certain embodiments, the UMV 102 can include mechanical and/or electromechanical means such as a rack, frame, bracket, electromagnet, and/or the like that is operable to latch, clasp, lock, attract and/or otherwise mate to the UMV 102. Further examples of the CPC 104 will be described with respect to FIGS. 3-4.

In certain embodiments, the UMV 102 can serve as custodian of the CPC 104 for so long as the CPC 104 is en route to the parcel's intended destination. In various embodiments, the UMV 102 can be a ground vehicle, a surface vehicle (e.g., a watercraft), an undersea vehicle, a spacecraft, combinations of same, and/or the like. For illustrative purposes, the UMV 102 is shown in FIG. 1 to be an unmanned aerial vehicle (UAV). In various cases, the UMV 102 can be remotely piloted, given autonomous control, a combination of same, and/or the like.

The UMV dock 106 can enable the UMV 102, or any other similarly configured UMV, to engage or attach thereto and be transported via the vehicle 108. In certain embodiments, the vehicle 108 can be a car, truck, bus, train and/or the like. In various embodiments, UMV docks similar to the UMV dock 106 can be disposed on taxi cabs for a given taxi company, buses for a given bus service, semi-trailer trucks for one or more trucking companies, personal vehicles with private or non-commercial drivers, combinations of same, and/or the like. In many cases, some vehicles can have multiple UMV docks disposed on a surface thereof. In these cases, in certain embodiments, each of the multiple UMV docks can be used independently of the other UMV docks. For example, each UMV and corresponding CPC attached to a vehicle at a given time (via one of the multiple UMV docks) can have different ultimate destinations.

The UMV dock 106 can be or include a rack, frame, bracket, electromagnet and/or the like that is operable to latch, clasp, lock, attract, or otherwise mate to the UMV 102. In addition, in certain embodiments, the UMV dock 106 can be communicably coupled, via a wired or wireless connection, to an onboard computer system of the vehicle 108. In these embodiments, the UMV dock 106 can provide the UMV 102 and/or the CPC 104 with access to one or more services of the vehicle 108 such as wide-area-network access (e.g., Internet access via Wi-Fi connection to the onboard computer system of the vehicle 108), global positioning system (GPS) services (e.g., to determine a location and/or route of the vehicle 108), etc. In certain embodiments, the UMV dock 106 can also charge or fuel the power sources (e.g. batteries) of the UMV 102 and/or the CPC 104 using a power source of the vehicle 108 (e.g., a battery).

In certain embodiments, the central authority 110 can be a central computer system that orchestrates transportation of a plurality of parcels via management of a plurality of UMVs that include the UMV 102. In these embodiments, the central authority 110 can determine real-time location information for each parcel and each UMV. Further, the central authority 110 can use the real-time location information to ensure route efficiency for each parcel. For example, in some embodiments, the central authority 110 can orchestrate transportation of millions of parcels by millions of UMVs. Example functionality of the central authority 110 will be described in greater detail with respect to the ensuing FIGURES.

In addition, or alternatively, any functionality described relative to the central authority 110 can be distributed to one or more of the UMV 102, the CPC 104, and/or the UMV dock 106. For example, the UMV 102 can make autonomous decisions regarding an optimal route to the intended destination of the parcel based on the same or similar real-time information described above with respect to the central authority 110.

Figure 2:
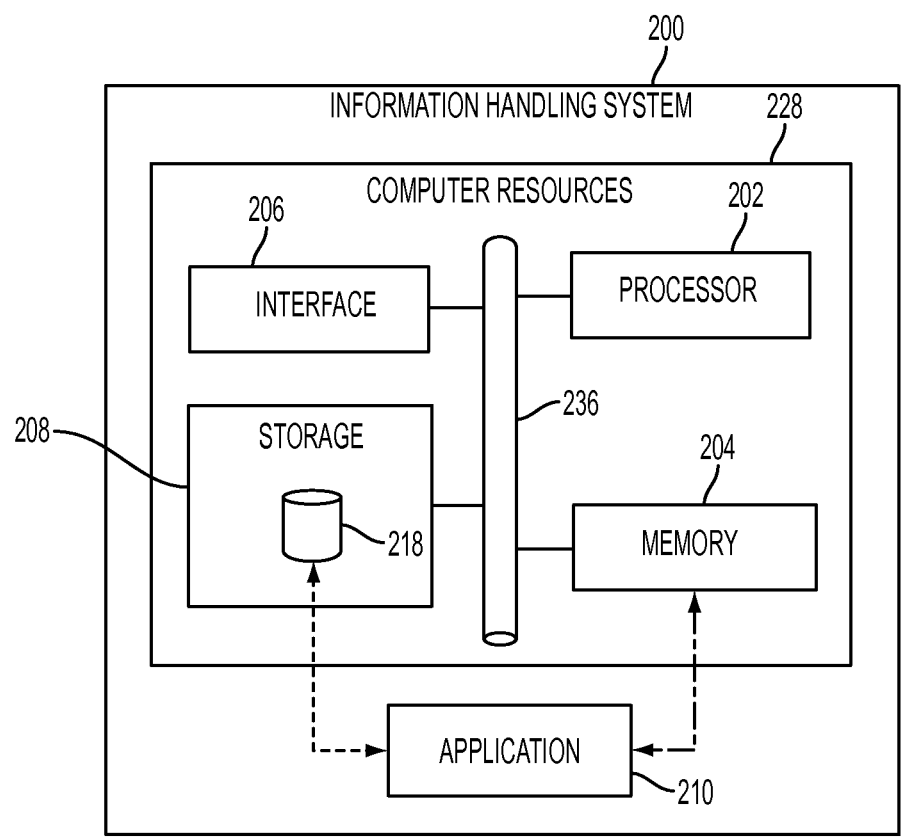
FIG. 2 illustrates an example of an information handling system.

FIG. 2 illustrates an example of an information handling system 200 that can be included, for example, within the UMV 102, the CPC 104, the UMV dock 106, the central authority 110, computer systems communicating with any of the foregoing, and/or the like. The information handling system 200 includes an application 210 operable to execute on computer resources 228. In particular embodiments, one or more instances of the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks. For example, in certain embodiments, all or part of the central authority 110 can reside in a cloud.

In the depicted embodiment, the information handling system 200 includes a processor 202, memory 204, storage 208, interface 206, and bus 236. Although a particular information handling system is depicted having a particular number of particular components in a particular arrangement, this disclosure contemplates any suitable information handling system having any suitable number of any suitable components in any suitable arrangement.

Processor 202 may be a microprocessor, controller, or any other suitable computing device, resource, or combination of hardware, software and/or encoded logic operable to execute, either alone or in conjunction with other components, (e.g., memory 204), the application 210. Such functionality may include providing various features discussed herein. In particular embodiments, processor 202 may include hardware for executing instructions, such as those making up the application 210. As an example and not by way of limitation, to execute instructions, processor 202 may retrieve (or fetch) instructions from an internal register, an internal cache, memory 204, or storage 208; decode and execute them; and then write one or more results to an internal register, an internal cache, memory 204, or storage 208.

In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 208 and the instruction caches may speed up retrieval of those instructions by processor 202. Data in the data caches may be copies of data in memory 204 or storage 208 for instructions executing at processor 202 to operate on; the results of previous instructions executed at processor 202 for access by subsequent instructions executing at processor 202, or for writing to memory 204, or storage 208; or other suitable data. The data caches may speed up read or write operations by processor 202. The TLBs may speed up virtual-address translations for processor 202. In particular embodiments, processor 202 may include one or more internal registers for data, instructions, or addresses. Depending on the embodiment, processor 202 may include any suitable number of any suitable internal registers, where appropriate. Where appropriate, processor 202 may include one or more arithmetic logic units (ALUs); be a multi-core processor; include one or more processors 202; or any other suitable processor.

Memory 204 may be any form of volatile or non-volatile memory including, without limitation, magnetic media, optical media, random access memory (RAM), read-only memory (ROM), flash memory, removable media, or any other suitable local or remote memory component or components. In particular embodiments, memory 204 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 204 may include one or more memories 204, where appropriate. Memory 204 may store any suitable data or information utilized by the information handling system 200, including software embedded in a computer readable medium, and/or encoded logic incorporated in hardware or otherwise stored (e.g., firmware). In particular embodiments, memory 204 may include main memory for storing instructions for processor 202 to execute or data for processor 202 to operate on. In particular embodiments, one or more memory management units (MMUs) may reside between processor 202 and memory 204 and facilitate accesses to memory 204 requested by processor 202.

As an example and not by way of limitation, the information handling system 200 may load instructions from storage 208 or another source (such as, for example, another computer system) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 may execute only instructions in one or more internal registers or internal caches or in memory 204 (as opposed to storage 208 or elsewhere) and may operate only on data in one or more internal registers or internal caches or in memory 204 (as opposed to storage 208 or elsewhere).

In particular embodiments, storage 208 may include mass storage for data or instructions. As an example and not by way of limitation, storage 208 may include a hard disk drive (HDD), a floppy disk drive, flash memory, an optical disc, a magneto-optical disc, magnetic tape, or a Universal Serial Bus (USB) drive or a combination of two or more of these. Storage 208 may include removable or non-removable (or fixed) media, where appropriate. Storage 208 may be internal or external to the information handling system 200, where appropriate. In particular embodiments, storage 208 may be non-volatile, solid-state memory. In particular embodiments, storage 208 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 208 may take any suitable physical form and may comprise any suitable number or type of storage. Storage 208 may include one or more storage control units facilitating communication between processor 202 and storage 208, where appropriate. In addition, in certain embodiments, the application 210 is operable to establish, or update, configurations in a data store 218 on the storage 208. The data store 218 can be a database, flat file, and/or the like. The configurations can include, for example, location information, scheduling information, and/or other information related to transporting a parcel to an intended destination.

In particular embodiments, interface 206 may include hardware, encoded software, or both providing one or more interfaces for communication (such as, for example, packet-based communication) among any networks, any network devices, and/or any other computer systems. As an example and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. By way of further example, the interface 206 can utilize communication via various other types of wireless communication such as infrared(IR) communication, radio frequency (RF) communication, communication via direct electrical connections, etc. In general, the information handling system 200 may include any suitable interface 206 for any one or more of these networks, where appropriate.

In some embodiments, interface 206 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 202 to drive one or more of these I/O devices. Interface 206 may include one or more interfaces 206, where appropriate.

Bus 236 may include any combination of hardware, software embedded in a computer readable medium, and/or encoded logic incorporated in hardware or otherwise stored (e.g., firmware) to couple components of the information handling system 200 to each other. As an example and not by way of limitation, bus 236 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 236 may include any number, type, and/or configuration of buses 236, where appropriate. In particular embodiments, one or more buses 236 (which may each include an address bus and a data bus) may couple processor 202 to memory 204. Bus 236 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 202 (such as, for example, one or more internal registers or caches), one or more portions of memory 204, one or more portions of storage 208, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
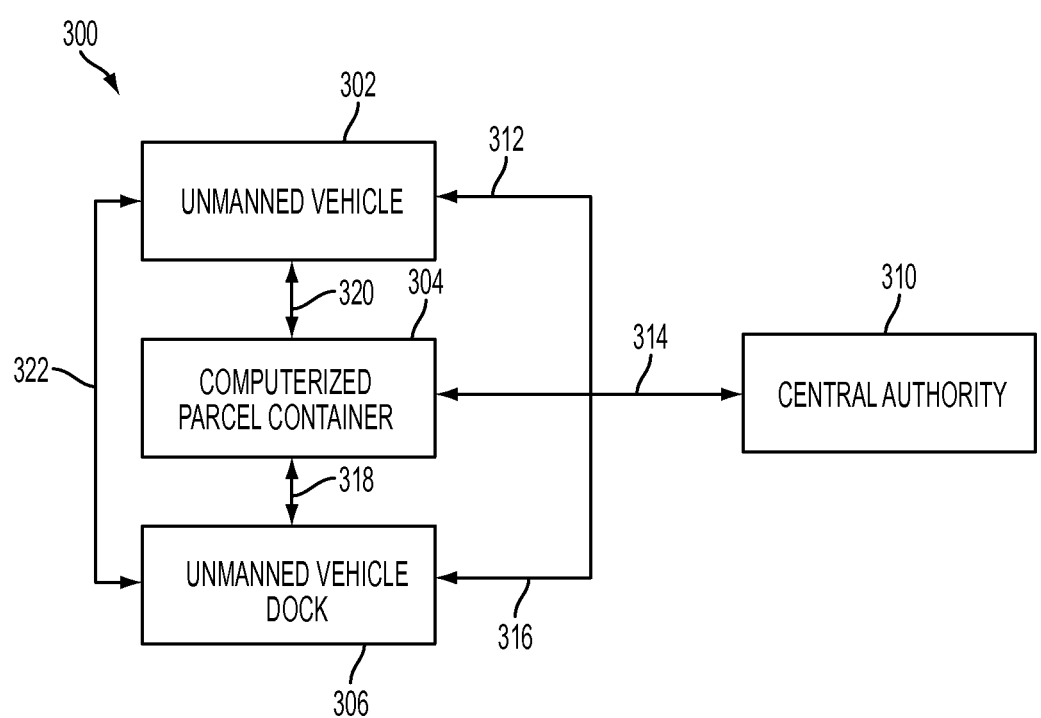
FIG. 3 illustrates an example communication framework.

FIG. 3 illustrates an example communication framework 300 for the UMV 102, the CPC 104, the UMV dock 106, and the central authority 110 of FIG. 1. The central authority 110 is operable to intercommunicate with the UMV 102, the CPC 104, and the UMV dock 106 via communication links 312, 314, and 316, respectively. In some embodiments, the central authority 110 can direct or control how the parcel is transported (e.g., selection of the UMV 102, the UMV dock 106, and/or the like).

In addition, or alternatively, the central authority 110 can be a source of information to the UMV 102. For example, the central authority 110 can provide weather information, information related to routes or travel schedules of other vehicles equipped with UMV docks, etc. In still other embodiments, the central authority 110 can be omitted such that all functionality described relative to the central authority 110 can be distributed, for example, to the UMV 102. In these embodiments, the UMV 102 can autonomously determine, based on real-time information, when to move from the vehicle 108 to another vehicle and/or the like. In an example, in some embodiments, the UMV 102 can communicate with other UMVs and/or other UMV docks using any of the communication methods described with respect to FIG. 2. In some of these embodiments, each UMV, including the UMV 102, can determine routes and locations of UMV docks within communication range thereof. In addition, or alternatively, in some of these embodiments, UMVs can communicate with other UMV docks over a wide-area network such as the Internet (e.g., using Wi-Fi services of vehicles such as the vehicle 108). UMVs such as the UMV 102 can also share determined location and route information using any of the communication methods described above.

In the illustrated embodiment, the UMV 102, the CPC 104, and the UMV dock 106 are shown to intercommunicate via communication links 318, 320, and 322. The communication links 318, 320, and 322 can be wired or wireless communication links utilizing, for example, any of the types of communication described above with respect to FIG. 2. In some embodiments, some of the communication links 318, 320, and 322 may be omitted. In an example, in some embodiments, the CPC 104 may not have any direct communication with the UMV dock 106.

Figure 4:
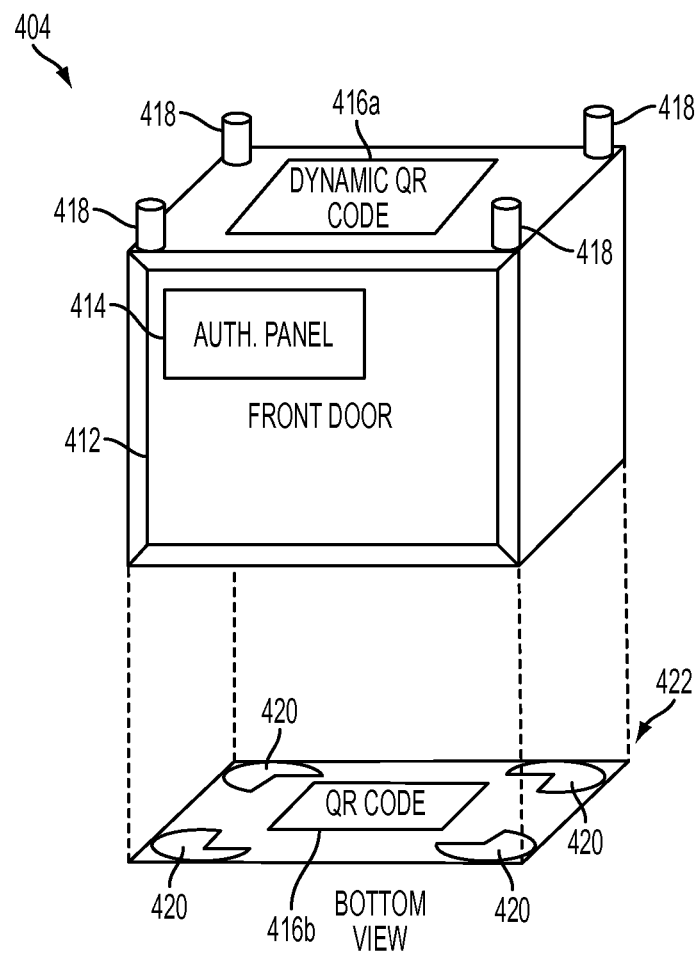
FIG. 4 illustrates an example configuration of a computerized parcel container (CPC).

FIG. 4 illustrates an example configuration of a CPC 404. In general, the CPC 404 can include any of the functionality and characteristics described above with respect to the CPC 104 of FIGS. 1-3. For simplicity of illustration, an exterior bottom surface 422 of the CPC 404 is shown via an exploded view.

As shown, the CPC 404 includes a barcode display 416*a* and top clasps 418 on an exterior top surface thereof. In addition, the CPC 404 includes a front door 412 on which is disposed an authentication panel 414. The exterior bottom surface 422 of the CPC 404 includes bottom clasps 420 and a barcode display 416*b*.

In certain embodiment, the top clasps 418 and the bottom clasps 420 can be used to attach the CPC 404 to a UMV such as the UMV 102 of FIGS. 1-3. In some embodiments, the top clasps 418 and/or the bottom clasps 420 can be magnetic so as to support, for example, automatic alignment with a clasp-receiving mechanism of a UMV such as the UMV 102. In addition, or alternatively, the top clasps 418 and/or the bottom clasps 420 can include a gravity-assist locking mechanism that allows the clasps to be lowered, or dropped, into final engagement with a clasp-receiving or locking means of the UMV 102.

Access to an interior of the CPC 104 is possible via the front door 412. In a typical embodiment, the front door 412 only opens after successful authentication via one or more suitable authentication methods including, but not limited to, biometric scanning, single-use tokens, passwords, near-field communication with a trusted device, combinations of same, and/or the like. In particular, in certain embodiments, the authentication panel 414 can include a keypad, biometric scanner, communications equipment, and/or the like for purposes of accomplishing the authentication. For example, the authentication panel 414 can include an information handling system similar to the information handling system 200 of FIG. 2.

The barcode display 416*a* and the barcode display 416*b* can allow a computer system such as the UMV to visually decode a barcode displayed thereon. In an example, the displayed barcode can be, for example, a quick response (QR) code or another suitable code that identifies the CPC 404 and/or one or more parcels to be enclosed in the CPC 404. In certain embodiments, the barcode display 416*a* and the barcode display 416*b* can include any means for displaying information including, for example, an electronic ink display, a light-emitting diode (LED) display, combinations of same, and/or the like.

Figure 5:
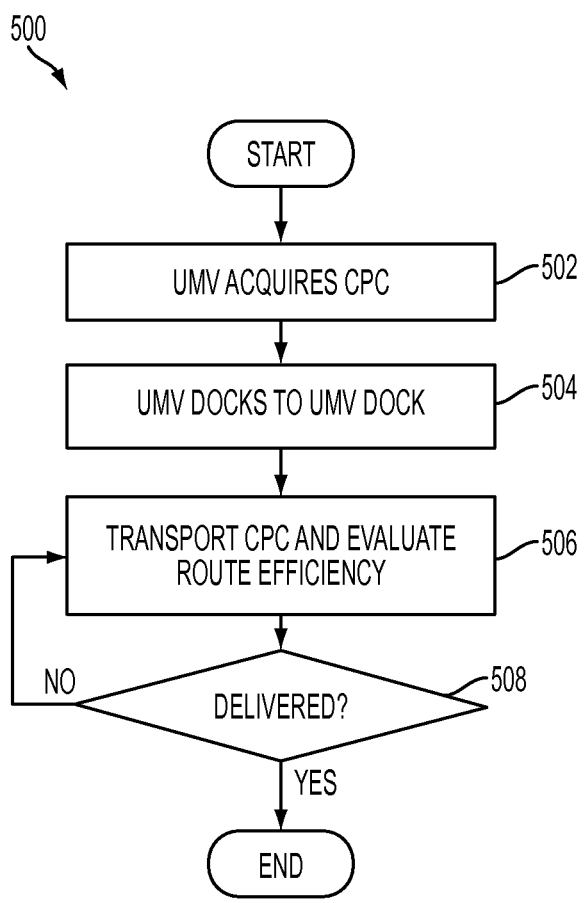
FIG. 5 illustrates an example of a process for transporting a parcel.

FIG. 5 illustrates an example of a process 500 for transporting a parcel. The process 500 can be implemented by any system that can receive and transmit data. For example, the process 500, in whole or in part, can be implemented by one or more of the UMV 102, the CPC 104, the UMV dock 106, and/or the central authority 110. The process 500 can also be implemented by the transportation scheme 100 generally. Although any number of systems, in whole or in part, can implement the process 500, to simplify discussion, the process 500 will be described in relation to specific systems or subsystems of the transportation scheme 100.

At block 502, the UMV 102 acquires the CPC 104. The acquisition of the CPC 104 can be initiated in any suitable fashion. For example, the UMV 102 can be summoned by a requestor in possession of the CPC 104, directed by the central authority 110 to a location of the CPC 104 (potentially in response to a request from a requestor), combinations of same, and/or the like. In some embodiments, the UMV 102 can also acquire the CPC in an automated manner. For example, the UMV 102 can be deployed in a warehouse responsible for initiating shipment or delivery of parcels to customers. In these embodiments, the UMV 102, along with potentially many other UMVs, can take custody of CPCs, for example, in an assembly-line fashion. Additionally, in some embodiments, the CPC 104 can be a component of the UMV 102. A more detailed example of how the UMV 102 can acquire the CPC 104 will be described in relation to FIG. 6.

At block 504, the UMV 102 docks to the UMV dock 106 of the vehicle 108. In some embodiments, the block 504 can include the central authority 110 (in centralized embodiments), the UMV 102 (in autonomous environments), or both comparing candidate vehicles and candidate routes. In these embodiments, since UMV docks such as the UMV dock 106 are generally attached to vehicles such as the vehicle 108, the locations and routes of the UMV docks may generally be considered to be the same as the locations and routes of the corresponding vehicles. In certain embodiments, the block 504 can include selecting a candidate route and a candidate vehicle (e.g., the vehicle 108) based, at least in part, on one or more efficiency factors such as transit cost, transit speed, safety record of the vehicle 108 and/or a driver or owner thereof, reputation of the vehicle 108 and/or a driver or owner thereof, insurance status of the vehicle 108 and/or a driver or owner thereof, a history of the vehicle 108 and/or a driver or owner thereof, a criminal record of a driver or owner of the vehicle 108, records from previous utilization of the vehicle 108 and/or a driver or owner thereof, directness of route relative to the intended destination, and projected time of arrival at the intended destination. Further examples of functionality that can be performed at the block 504 will be described in greater detail with respect to FIG. 7.

At block 506, the CPC 104 (and enclosed parcel) are transported, with route efficiency being evaluated periodically, on-demand or, in some cases, continuously. Transporting the CPC 104 can include the UMV 102 undocking from the vehicle 108 and docking to replacement vehicles at designated junctures (e.g., a particular time, particular location, combinations of same, and/or the like). The designated junctures can be determined, for example, as part of the candidate route that is selected at the block 504. Further examples of functionality that can be performed at the block 506 will be described with respect to FIG. 8.

At decision block 508, it is determined whether the parcel has been delivered to its intended destination. In certain embodiments, the CPC 104 may be considered to be delivered when the CPC 104 arrives at the intended destination. In other embodiments, additional requirements can be imposed such as, for example, a requirement for successful authentication on the CPC 104. In some cases, the UMV 102 may deposit the CPC 104 at the intended destination. If it is determined at the decision block 508 that the parcel has not yet been delivered to its intended destination, the process 500 returns to block 506 and proceeds as described above. Otherwise, if it is determined at the decision block 508 that the parcel has been transported to the intended destination, the process 500 ends. In various embodiments, the UMV dock 106 can accept payments from the UMV 102, for example, at a time of docking, a time of undocking, and/or the like. In certain embodiments, the payments can be made via a cryptocurrency.

In some embodiments, a process similar to the process 500 can be executed without a CPC such as the CPC 104. For example, after the UMV 102 delivers the CPC 104, the UMV 102 may need to return home to a base or headquarters, travel to a pick-up location of a parcel, etc. In these embodiments, the UMV 102 may travel in a similar fashion to that which is described above, without a CPC, in order to reach a next destination. In these embodiments, the process 500 can be modified such that the block 502 is omitted and such that the UMV 102 travels to its next destination instead of to an intended destination of a parcel or CPC.

Figure 6:
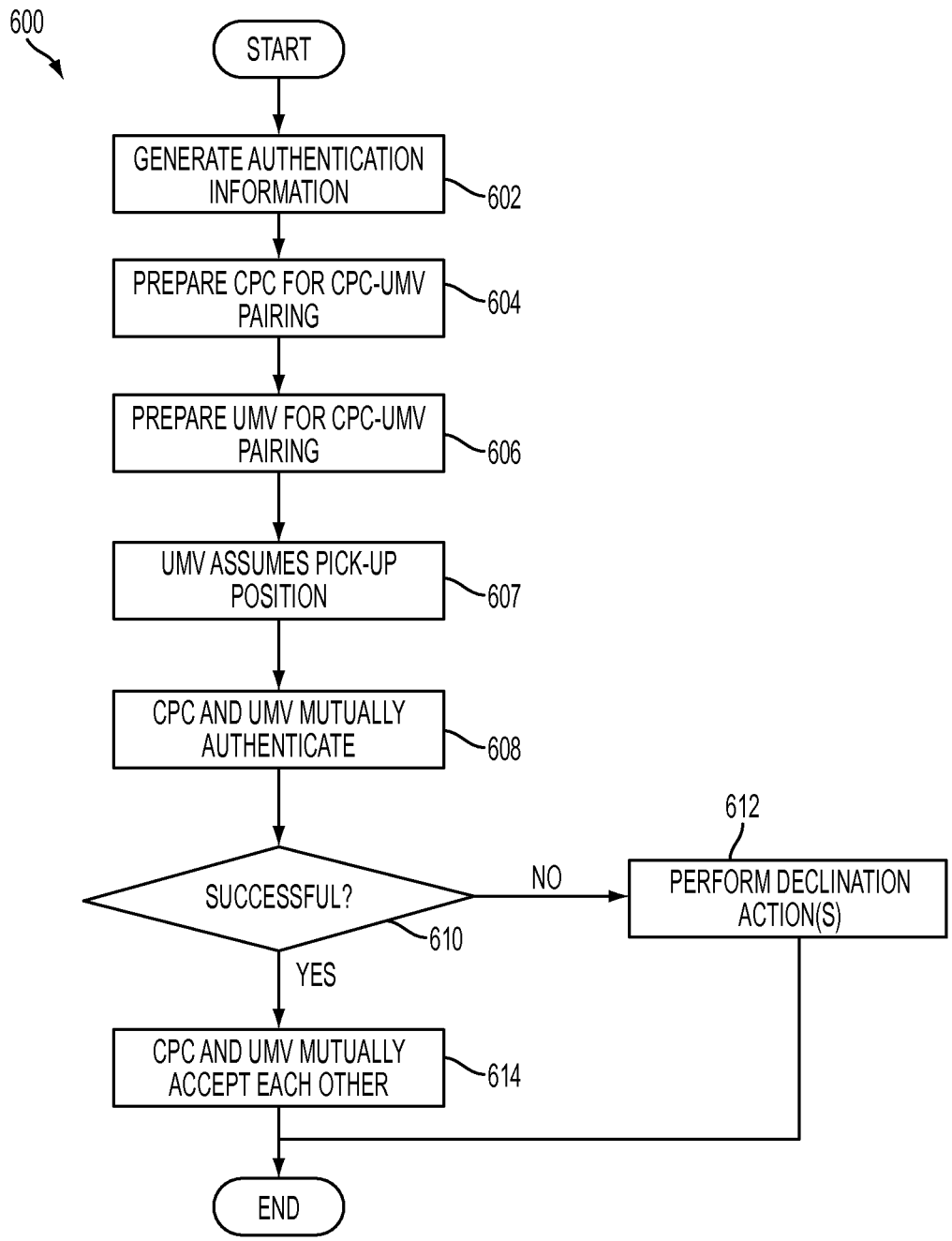
FIG. 6 illustrates an example of a process for a unmanned vehicle (UMV) acquiring a CPC.

FIG. 6 illustrates an example of a process 600 for a UMV acquiring a CPC. In certain embodiments, all or part of the process 600 can be performed during the block 502 of FIG. 5. The process 600 can be implemented by any system that can receive and transmit data. For example, the process 600, in whole or in part, can be implemented by one or more of the UMV 102, the CPC 104, the UMV dock 106, and/or the central authority 110. The process 600 can also be implemented by the transportation scheme 100 generally. Although any number of systems, in whole or in part, can implement the process 600, to simplify discussion, the process 600 will be described in relation to specific systems or subsystems of the transportation scheme 100.

At block 602, authentication information is generated for a CPC and a UMV that have been selected to transport a parcel (i.e., a CPC-UMV pairing). For purposes of the example of FIG. 6, the selected CPC and the selected UMV are the CPC 104 and the UMV 102, respectively, of FIGS. 1-3. It should be appreciated that the authentication information can take numerous forms in accordance with particular authentication methods that may be desirable for particular implementations.

By way of example, in some implementations, the authentication information can include asymmetric key pairs. In these implementations, the central authority 110, or another component, can generate two asymmetric key pairs: a CPC-specific key pair for the CPC 104 and a UMV-specific key pair for the UMV 102. The asymmetric key pairs can be generated using an encryption algorithm such as RSA, DSA, ECDSA, variants thereof, and/or the like. Each asymmetric key pair generally includes a public key and a private key.

In some embodiments, the CPC-specific key pair and the UMV-specific key pair are specific to the CPC-UMV pairing (i.e., single-use). In still other embodiments, a single, reusable asymmetric key pair may be generated for each of the CPC 104 and the UMV 102. In these embodiments, if the single asymmetric key pairs or other suitable authentication information has already been generated, the block 602 can be omitted. In some of these embodiments, the CPC-specific key pair and the UMV-specific key pair are each parcel-specific such that new asymmetric key pairs are generated for each parcel to be transported. Such parcel-specific key pairs may be reused for other authentication processes during transportation of the associated parcel. In others of these embodiments, the CPC-specific key pair and the UMV-specific key pair are reusable for multiple parcels and for multiple authentication processes involving the CPC 104 and/or the UMV 102. In various cases, if the asymmetric key pairs or other suitable authentication information has already been generated and one or both are reusable, the block 602 can be at least partially omitted.

At block 604, the CPC 104 is prepared for the CPC-UMV pairing. The preparation of the CPC 104 can include providing the CPC 104 with certain CPC initialization information such as, for example, information related to a parcel that is to be enclosed therein (e.g., a unique ID of the parcel), information related to an intended destination of the parcel (e.g., an address, geographic coordinates, etc.), information related to a UMV that will be escorting the CPC 104 to the intended destination (e.g., a unique ID of the UMV 102), and CPC-relevant authentication information. In an example, the CPC-relevant authentication information can include a private key of the CPC-specific key pair (or potentially an entirety of the CPC-specific key pair) and a public key of the UMV-specific key pair. In embodiments in which the CPC-specific key pair is reusable in the fashion described above and has already been provided to the CPC 104, information relating thereto may be omitted from the CPC-relevant authentication information. In various embodiments, the CPC initialization information can be provided by the central authority 110, a trusted computing device or system, a human interacting therewith, combinations of same, and/or the like.

At block 606, the UMV 102 is prepared for the CPC-UMV pairing. The preparation of the UMV 102 can include providing the UMV 102 with certain UMV initialization information such as, for example, information related to a parcel that is to be carried thereby (e.g., a unique ID of the parcel), information related to an intended destination of the parcel (e.g., an address, geographic coordinates, etc.), information related to a CPC that will be enclosing the parcel (e.g., a unique ID of the CPC 104), and UMV-relevant authentication information. In an example, the UMV-relevant authentication information can include a private key of the UMV-specific key pair (or potentially an entirety of the UMV-specific key pair) and a public key of the CPC-specific key pair. In embodiments in which the UMV-specific key pair is reusable in the fashion described above and has already been provided to the UMV 102, information relating thereto may be omitted from the UMV-relevant authentication information. In various embodiments, the UMV initialization information can be provided by the central authority 110, a trusted computing device or system, a human interacting therewith, combinations of same, and/or the like. In some embodiments, at least a portion of the UMV initialization information can be attained by reading a barcode display such as the barcode display 416a or the barcode display 416b.

At block 607, the UMV 102 assumes a pick-up position relative to the CPC 104, for example, by moving within close range of the CPC 104. In some embodiments, human or machine interaction can cause or facilitate the assumption of the pick-up position.

At block 608, the CPC 104 and the UMV 102 mutually authenticate. In particular, the CPC 104 can authenticate the UMV 102 and the UMV 102 can authenticate the CPC 104. In general, the mutual authentication can be accomplished in any suitable fashion. In an example, the UMV 102 can send an authentication request to the CPC 104 that is digitally signed using a private key of the UMV-specific key pair described above. Thereafter, the CPC 104 can validate the digital signature of the UMV 102 using the public key of the UMV-specific key pair. In similar fashion, the CPC 104 can send an authentication request to the UMV 102 such that the authentication request is digitally signed using the private key of the CPC-specific key pair. Thereafter, the UMV 102 can validate the digital signature of the CPC 104 using the public key of the CPC-specific key pair. According to this example, successful validation of both the digital signature of the CPC 104 and of the digital signature of the UMV 102 results in successful mutual authentication. It should be appreciated that mutual authentication can also be accomplished in many other suitable ways that include, for example, third-party authentication services.

At decision block 610, it is determined whether the mutual authentication at block 608 was successful. If not, at block 612, one or more declination actions may be performed. For example, if the UMV 102 is unable to successfully authenticate the CPC 104, the UMV 102 may physically decline the CPC 104 by failing to grasp, clasp, or enclose the CPC 104. Further, the UMV 102 can decline to transport the CPC 104, notify the central authority 110 (if one is included in a particular implementation), and/or notify a user associated with the parcel. In another example, if the CPC 104 is unable to successfully authenticate the UMV 102, the CPC 104 can sound an audible alarm (if equipped), notify the central authority 110 (if one is included in a particular implementation), notify a user associated with the parcel, combinations of same, and/or the like. After block 612, the process 600 ends.

If it is determined at the decision block 610 that the mutual authentication was successful, at block 614, the UMV 102 and the CPC 104 mutually accept each other. For example, the UMV 102 can begin transporting the CPC 104 and the CPC 104 can allow itself to be transported. After block 614, the process 600 ends.

Figure 7:
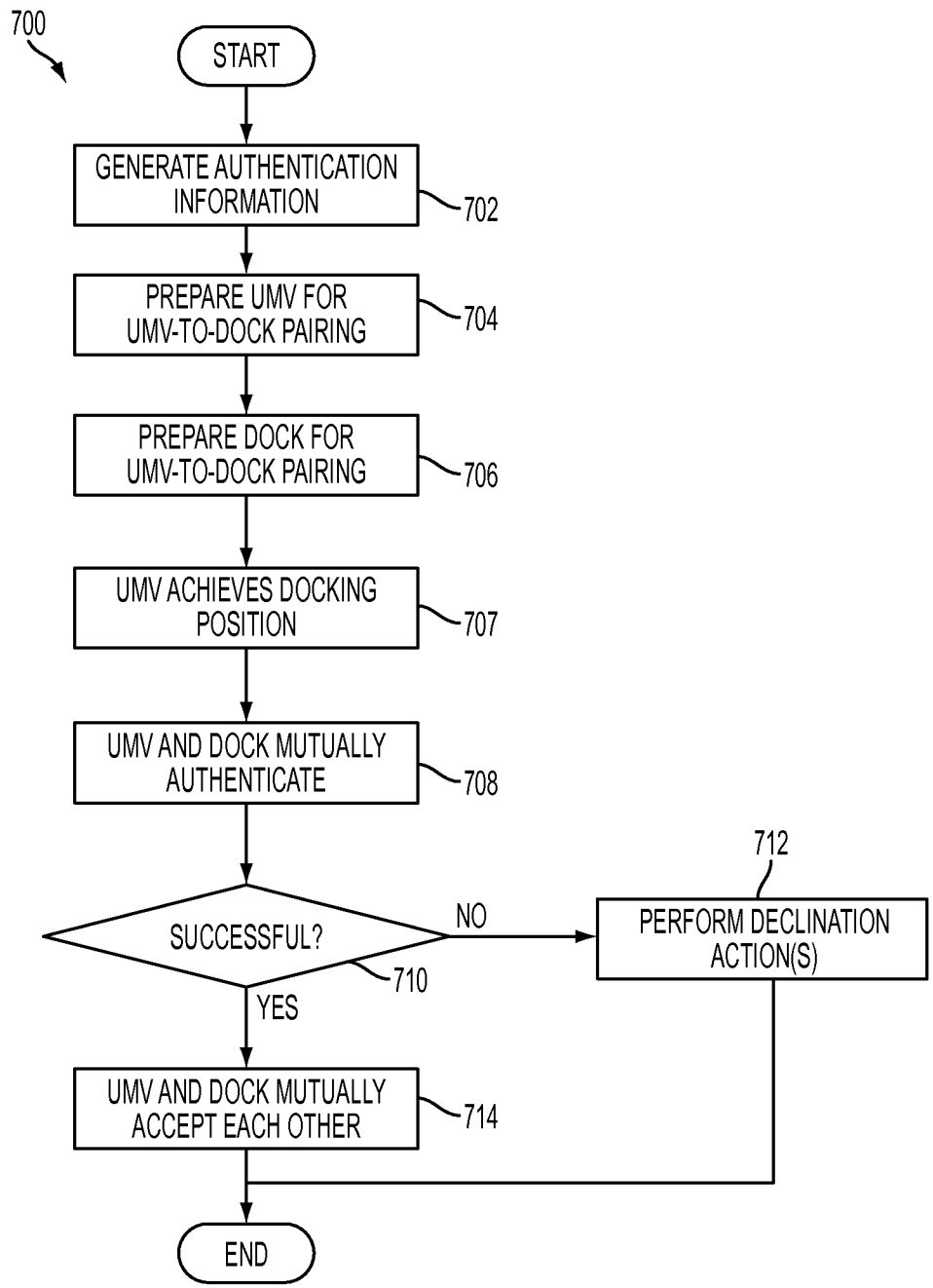
FIG. 7 illustrates an example of a process for a UMV docking to a UMV dock.

FIG. 7 illustrates an example of a process 700 for a UMV docking to a UMV dock. In certain embodiments, all or part of the process 700 can be performed during the block 504 of FIG. 5. The process 700 can be implemented by any system that can receive and transmit data. For example, the process 700, in whole or in part, can be implemented by one or more of the UMV 102, the CPC 104, the UMV dock 106, and/or the central authority 110. The process 700 can also be implemented by the transportation scheme 100 generally. Although any number of systems, in whole or in part, can implement the process 700, to simplify discussion, the process 700 will be described in relation to specific systems or subsystems of the transportation scheme 100.

At block 702, authentication information is generated for a UMV and a UMV dock that have been selected to transport a parcel (i.e., a UMV-to-dock pairing). For purposes of the example of FIG. 7, the selected UMV and the selected UMV dock are the UMV 102 and the UMV dock 106, respectively, of FIGS. 1-3. It should be appreciated that the authentication information can take numerous forms in accordance with particular authentication methods that may be desirable for particular implementations.

By way of example, in some implementations, the authentication information can include asymmetric key pairs of the type described above. In these implementations, the central authority 110, or another component, can generate two asymmetric key pairs: a UMV-specific key pair for the UMV 102 and a dock-specific key pair for the UMV dock 106. The asymmetric key pairs can be generated using an encryption algorithm such as RSA, DSA, ECDSA, variants thereof, and/or the like. Each asymmetric key pair generally includes a public key and a private key.

In some embodiments, the UMV-specific key pair and the dock-specific key pair are particular to the UMV-to-dock pairing (i.e., single-use). In still other embodiments, a single, reusable asymmetric key pair may be generated for each of the UMV 102 and the UMV dock 106. In these embodiments, if the single asymmetric key pairs or other suitable authentication information has already been generated, the block 702 can be omitted. In some of these embodiments, the UMV-specific key pair and the dock-specific key pair are each parcel-specific such that new asymmetric key pairs are generated for each parcel to be transported. Such parcel-specific key pairs may be re-used for other authentication processes during transportation of the associated parcel. In others of these embodiments, the UMV-specific key pair and the dock-specific key pair are reusable for multiple parcels and for multiple authentication processes involving the UMV 102 and/or the UMV dock 106. In various cases, if the asymmetric key pairs or other suitable authentication information has already been generated and one or both are reusable, the block 702 can be at least partially omitted.

At block 704, the UMV 102 is prepared for the UMV-to-dock pairing. The preparation of the UMV 102 can include providing the UMV 102 with certain UMV initialization information such as, for example, information related to the UMV dock 106 (e.g., an ID of the UMV dock 106) and UMV-relevant authentication information. In an example, the UMV-relevant authentication information can include a private key of the UMV-specific key pair (or potentially an entirety of the UMV-specific key pair) and a public key of the dock-specific key pair. In embodiments in which the UMV-specific key pair is reusable in the fashion described above and has already been provided, at least in part, to the CPC 104, information relating thereto may be omitted from the UMV-relevant authentication information. In various embodiments, the UMV initialization information can be provided by the central authority 110, a trusted computing device or system, a human interacting therewith, combinations of same, and/or the like.

At block 706, the UMV dock 106 is prepared for the UMV-to-dock pairing. The preparation of the UMV dock 106 can include providing the UMV dock 106 with certain dock initialization information such as, for example, information related to a UMV that will be docking thereto (e.g., an ID of the UMV 102) and dock-relevant authentication information. In an example, the dock-relevant authentication information can include a private key of the dock-specific key pair (or potentially an entirety of the dock-specific key pair) and a public key of the UMV-specific key pair. In embodiments in which the dock-specific key pair is reusable in the fashion described above and has already been provided to the UMV dock 106, information relating thereto may be omitted from the UMV-relevant authentication information. In various embodiments, the dock initialization information can be provided by the central authority 110, a trusted computing device or system, a human interacting therewith, combinations of same, and/or the like.

At block 707, the UMV 102 achieves a docking position relative to the UMV dock 106, for example, by moving within close range of the UMV dock 106. In some embodiments, human or machine interaction can cause or facilitate achievement of the docking position.

At block 708, the UMV 102 and the UMV dock 106 mutually authenticate. In particular, the UMV 102 can authenticate the UMV dock 106 and the UMV dock 106 can authenticate the UMV 102. In general, the mutual authentication can be accomplished in any suitable fashion. In an example, the UMV dock 106 can send an authentication request to the UMV 102 that is digitally signed using a private key of the dock-specific key pair described above. Thereafter, the UMV 102 can validate the digital signature of the UMV dock 106 using the public key of the dock-specific key pair. In similar fashion, the UMV 102 can send an authentication request to the UMV dock 106 such that the authentication request is digitally signed using the private key of the UMV-specific key pair. Thereafter, the UMV dock 106 can validate the digital signature of the UMV 102 using the public key of the UMV-specific key pair. According to this example, successful validation of both the digital signature of the UMV 102 and of the digital signature of the UMV dock 106 results in successful mutual authentication. It should be appreciated that mutual authentication can also be accomplished in many other suitable ways that include, for example, third-party authentication services.

At decision block 710, it is determined whether the mutual authentication at block 708 was successful. If not, at block 712, one or more declination actions may be performed. For example, if the UMV dock 106 is unable to successfully authenticate the UMV 102, the UMV dock 106 may physically decline the UMV 102 by refusing to grasp, clasp, or otherwise engage with the UMV 102, as applicable.

In another example, in certain embodiments, the UMV 102 and the UMV dock 106 can each include a set of one or more electromagnets (e.g., electro-permanent magnets) that facilitate attachment of the UMV 102 to the UMV dock 106. In these embodiments, the UMV dock 106 can physically decline the UMV 102 by reversing the polarity of its set of electromagnets (e.g., by reversing the flow of electricity). In addition, or alternatively, the UMV dock 106 can notify the central authority 110 (if one is included in a particular implementation) and/or notify a user associated with the parcel.

In another example, if the UMV 102 is unable to successfully authenticate the UMV dock 106, the UMV 102 can physically decline engagement by not docking with the UMV dock. Further, according to this example, the UMV 102 can notify the central authority 110 for purposes of triggering selection of another UMV dock. After block 712, the process 700 ends.

If it is determined at the decision block 710 that the mutual authentication was successful, at block 714, the UMV dock 106 and the UMV 102 mutually accept each other. For example, the UMV 102 can engage with the UMV dock to achieve a locked position. After block 714, the process 700 ends.

Figure 8:
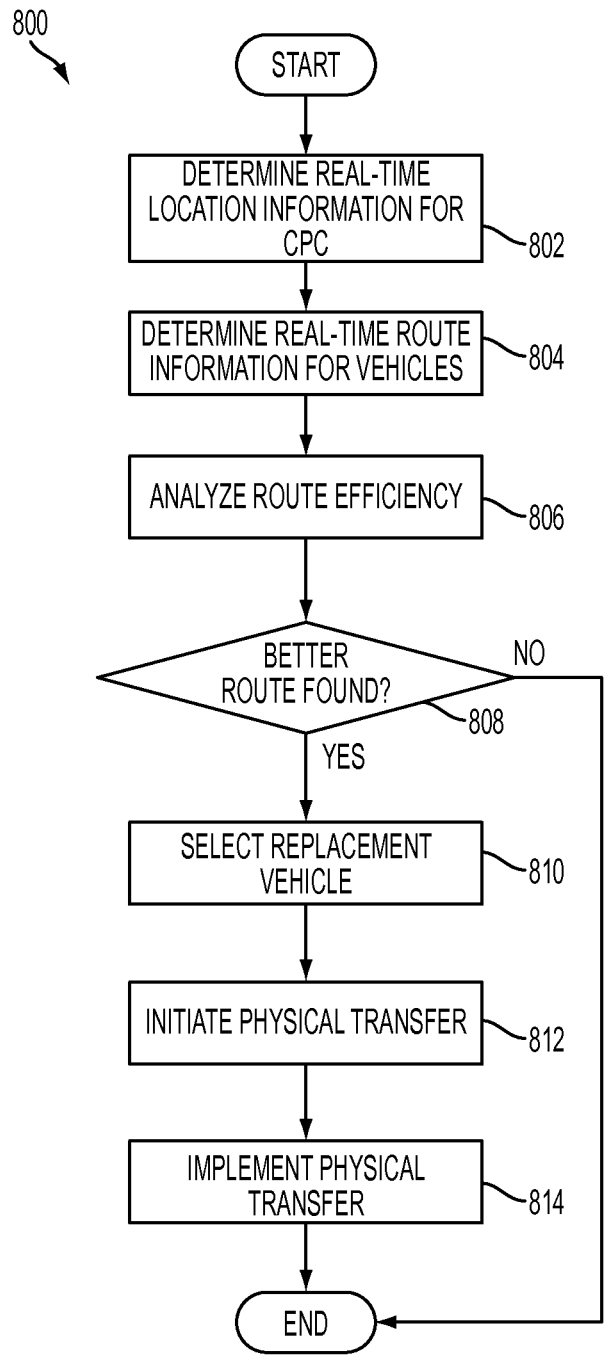
FIG. 8 illustrates an example of a process for optimizing a transportation route of a parcel.

FIG. 8 illustrates an example of a process 800 for optimizing a transportation route of a parcel. In a typical embodiment, at the time of initiation of the process 800, a vehicle-in-transit is actively transporting the CPC 104. Actively transporting, in general, can mean that the a UMV carrying the CPC is currently docked to the vehicle-in-transit. The vehicle-in-transit can be, for example, the vehicle 108 of FIG. 1. In various embodiments, the process 800 can be performed on-demand, at periodic intervals, continuously, and/or the like.

In certain embodiments, all or part of the process 800 can be performed during the block 506 of FIG. 5. The process 800 can be implemented by any system that can receive and transmit data. For example, the process 800, in whole or in part, can be implemented by one or more of the UMV 102, the CPC 104, the UMV dock 106, and/or the central authority 110. The process 800 can also be implemented by the transportation scheme 100 generally. Although any number of systems, in whole or in part, can implement the process 800, to simplify discussion, the process 800 will be described in relation to specific systems or subsystems of the transportation scheme 100.

At block 802, real-time location information is determined for the CPC 104. In certain embodiments, a real-time location of the CPC 104 can be known by the CPC 104, the UMV 102 that is carrying the CPC 104, the UMV dock 106 currently being used to transport the UMV 102, and/or the like. In an example, in embodiments in which the central authority 110 performs the block 802, the real-time location information can be determined via communication with the UMV 102, the CPC 104, and/or the UMV dock 106. In another example, in embodiments in which the UMV 102 performs the block 802, the real-time location can be from internal GPS functionality or storage, via communication with the CPC 104 or the UMV dock 106, combinations of same, and/or the like.

At block 804, real-time route information is determined for a plurality of vehicles that are equipped with appropriately configured UMV docks. In general, the real-time route information for a given vehicle is indicative of where the vehicle currently is or will be traveling. The real-time route information can also include other information such as, for example, a current speed of travel, scheduling information (e.g., scheduled time of departure, periods of travel, etc.), traffic along the route, cost of the route (e.g., amount that would be paid to a person or entity associated with a given UMV dock), weather along the route, combinations of same, and/or the like.

In certain embodiments, the real-time route information can be determined from various sources. In an example, a driver, person, or other entity associated with each such vehicle can register routes and corresponding information with the central authority 110. In another example, at least a portion of the real-time route information can be determined via communication with the UMV docks of the vehicles. In yet another example, at least a portion of the real-time route information can be derived from information obtained from the foregoing example sources. For instance, in various cases, a speed of travel can be determined from tracked locations over a short period of time, weather and traffic information can be accessed for a determined route, future traffic and speed of travel can be projected based on historical traffic patterns for the route, combinations of same, and/or the like. The real-time route information can also be determined via a combination of the foregoing ways and/or in other suitable ways.

At block 806, a route efficiency of the plurality of vehicles is analyzed relative to the intended destination of the CPC 104. In general, the block 806 can involve comparing candidate routes for transporting the CPC 104 to the intended destination. In many cases, some of the candidate routes can include planned vehicle changes at certain junctures (e.g. certain place, certain time, etc.). Route efficiency can be measured in various ways including, but not limited to, transit cost, transit speed, directness of route relative to the intended destination, projected time of arrival, combinations of same, and/or the like.

At decision block 808, it is determined whether there is a better route than an existing route as measured, for example, by route efficiency. If not, the process 800 ends. Otherwise, if it is determined at decision block 808 that there is a better route than the existing route, a replacement vehicle is selected at block 810. In certain embodiments, the replacement vehicle may correspond to at least a first leg of a route deemed most efficient.

At block 812, physical transfer of the CPC 104 is initiated. In general, the block 812 can include communicating with a UMV dock of the replacement vehicle to reserve that UMV dock for the UMV 102. In embodiments in which the central authority 110 performs the block 812, the initiation can further include transmitting an instruction to the UMV 102 to undock from the at least one vehicle-in-transit and dock to the replacement vehicle. At block 814, physical transfer is implemented. In general, the block 814 can involve performing a process similar to the process 700 of FIG. 7. After block 814, the process 800 ends.

It should be appreciated that numerous variations of the foregoing are contemplated. For example, in some implementations, the transportation scheme 100 of FIG. 1 can be modified so as to exclude the UMV 102. In these implementations, the UMV dock 106 can, in effect, be a CPC dock that receives and carries CPCs. In these embodiments, all functionality described herein relative to UMVs such as the UMV 102 can be conflated into the CPC 104, with the exception that the CPC 104 would not typically have independent or autonomous mobility. For example, with regard to the process 500 of FIG. 5, block 502 can be omitted. In addition, with regard to block 506 of FIG. 5 and, more specifically, the process 800 of FIG. 8, decisions to physically transfer the CPC 104 can be presented as recommendations to users and/or drivers (e.g., instructions transmitted by email, text message, etc.). Human and/or machine interaction can facilitate implementation of physical transfers, mutual authentication, etc. Other variations of the foregoing will be apparent to one skilled in the art after reviewing the present disclosure.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising:
   determining, by a computer system, real-time location information for a transportation item, wherein the transportation item comprises an unmanned vehicle;
   the computer system determining real-time route information for a plurality of vehicles, the plurality of vehicles comprising a vehicle-in-transit actively transporting the transportation item;
   the computer system analyzing, via the real-time location information and the real-time route information, a route efficiency of the plurality of vehicles relative to an intended destination of the transportation item;
   the computer system selecting a replacement vehicle from among the plurality of vehicles based, at least in part, on a result of the analyzing;
   the unmanned vehicle undocking from an unmanned-vehicle dock disposed on a surface of the vehicle-in-transit;
   the unmanned vehicle achieving a docking position relative to the replacement vehicle;
   the unmanned-vehicle dock of the replacement vehicle authenticating the unmanned vehicle;
   responsive to successful authentication of the unmanned vehicle by the unmanned-vehicle dock, the unmanned vehicle docking to the unmanned-vehicle dock of the replacement vehicle; and
   responsive to unsuccessful authentication of the unmanned vehicle by the unmanned-vehicle dock, the unmanned-vehicle dock physically declining engagement with the unmanned vehicle, the physically declining comprising reversing electromagnet polarity.

2. The method of claim 1, wherein the transportation item comprises a computerized parcel container operable to enclose a parcel.

3. The method of claim 2, wherein the computerized parcel container is carried by the unmanned vehicle.

4. The method of claim 3, comprising the unmanned-vehicle dock receiving a payment from the unmanned vehicle.

5. The method of claim 3, wherein the computer system is an integral part of the unmanned vehicle.

6. The method of claim 3, wherein the computer system is a central computer system that controls a plurality of unmanned vehicles.

7. The method of claim 3, comprising the unmanned vehicle acquiring the computerized parcel container, the acquiring comprising:
   the unmanned vehicle authenticating the computerized parcel container;
   the computerized parcel container authenticating the unmanned vehicle; and
   responsive to successful authentication of the computerized parcel container and the unmanned vehicle, the unmanned vehicle and the computerized parcel container mutually accepting each other.

8. The method of claim 1, comprising:
   the unmanned vehicle authenticating the unmanned-vehicle dock; and
   responsive to unsuccessful authentication of the unmanned-vehicle dock by the unmanned vehicle, the unmanned vehicle physically declining engagement with the unmanned-vehicle dock.

9. The method of claim 1, wherein the replacement vehicle is deemed to improve upon the vehicle-in-transit based, at least in part, on at least one of the following factors: transit cost, transit speed, directness of route relative to the intended destination, and projected time of arrival at the intended destination.

10. The method of claim 1, wherein the computer system continuously analyzes the route efficiency of the plurality of vehicles relative to the intended destination.

11. An information handling system comprising:
    at least one processor and memory, wherein the at least one processor and memory in combination are operable to implement a method comprising:
       determining real-time location information for a transportation item, wherein the transportation item comprises an unmanned vehicle;
       determining real-time route information for a plurality of vehicles, the plurality of vehicles comprising a vehicle-in-transit actively transporting the transportation item;
       analyzing, via the real-time location information and the real-time route information, a route efficiency of the plurality of vehicles relative to an intended destination of the transportation item;
       selecting a replacement vehicle from among the plurality of vehicles based, at least in part, on a result of the analyzing; causing the unmanned vehicle to undock from an unmanned-vehicle dock on a surface of the vehicle-in-transit;
       causing the unmanned vehicle to achieve a docking position relative to the replacement vehicle;
       causing the unmanned-vehicle dock to authenticate the unmanned vehicle;
       responsive to successful authentication of the unmanned vehicle by the unmanned-vehicle dock, causing the unmanned vehicle to dock to an unmanned-vehicle dock of the replacement vehicle; and
       responsive to unsuccessful authentication of the unmanned vehicle by the unmanned-vehicle dock, causing the unmanned-vehicle dock to physically decline engagement with the unmanned vehicle, the physically declining comprising reversing electromagnet polarity.

12. The information handling system of claim 11, wherein the transportation item comprises a computerized parcel container operable to enclose a parcel; and
    the computerized parcel container is carried by the unmanned vehicle.

13. The information handling system of claim 12, wherein the information handling system is a central computer system that controls a plurality of unmanned vehicles.

14. The information handling system of claim 11, the method comprising:
    causing the unmanned vehicle to authenticate the unmanned-vehicle dock; and
    responsive to unsuccessful authentication of the unmanned-vehicle dock by the unmanned vehicle, causing the unmanned vehicle to physically decline engagement with the unmanned-vehicle dock.

15. A computer-program product comprising a non-transitory computer-usable medium having computer-readable program code embodied therein, the computer-readable program code adapted to be executed to implement a method comprising:

determining real-time location information for a transportation item, wherein the transportation item comprises an unmanned vehicle;

determining real-time route information for a plurality of vehicles, the plurality of vehicles comprising a vehicle-in-transit actively transporting the transportation item;

analyzing, via the real-time location information and the real-time route information, a route efficiency of the plurality of vehicles relative to an intended destination of the transportation item;

selecting a replacement vehicle from among the plurality of vehicles based, at least in part, on a result of the analyzing;

causing the unmanned vehicle to undock from an unmanned-vehicle dock on a surface of the vehicle-in-transit;

causing the unmanned vehicle to achieve a docking position relative to the replacement vehicle;

causing the unmanned-vehicle dock to authenticate the unmanned vehicle;

responsive to successful authentication of the unmanned vehicle by the unmanned-vehicle dock, causing the unmanned vehicle to dock to an unmanned-vehicle dock of the replacement vehicle; and responsive to unsuccessful authentication of the unmanned vehicle by the unmanned-vehicle dock, causing the unmanned-vehicle dock to physically decline engagement with the unmanned vehicle, the physically declining comprising reversing electromagnet polarity.

* * * * *